United States Patent [19]

Shea et al.

[11] Patent Number: 5,267,723
[45] Date of Patent: Dec. 7, 1993

[54] SELF-ALIGNING LEAD-IN CHAMFER FOR A VALVE SEAT

[75] Inventors: Stephen F. Shea; Scott W. Quigley, both of Newport News, Va.

[73] Assignee: Siemens Automotive L.P., Auburn Hills, Mich.

[21] Appl. No.: 50,926

[22] Filed: Apr. 21, 1993

[51] Int. Cl.$^5$ .............................................. F16K 51/00
[52] U.S. Cl. ................ 251/359.1; 251/359; 137/315
[58] Field of Search ................ 251/359, 365; 137/315, 137/15

[56] References Cited

U.S. PATENT DOCUMENTS

| | | | |
|---|---|---|---|
| 2,078,903 | 4/1937 | Domack | 251/365 |
| 2,121,464 | 6/1938 | Zagorski | 251/365 |
| 2,210,046 | 8/1940 | Schubring | 251/365 |
| 2,471,880 | 5/1949 | MacDonald | 251/365 |
| 4,676,482 | 6/1987 | Reece et al. | 251/365 |

*Primary Examiner*—A. Michael Chambers
*Attorney, Agent, or Firm*—George L. Boller; Russel C. Wells

[57] ABSTRACT

Lead-in of a valve seat member being pressed into a valve body bore has larger angle initial lead-in portion followed by smaller angle transition lead-in portion leading to press-fit outside diameter. This prevents a maximally misaligned valve seat member from shaving a silver as the lead-in passes across the shoulder of a counterbore at the entrance of the press-fit inside diameter of the bore.

4 Claims, 2 Drawing Sheets

SELF-ALIGNING LEAD-IN CHAMFER FOR A VALVE SEAT

FIELD OF THE INVENTION

This invention relates to fluid valves, particularly those in which a valve seat member has a press-fit in a bore of a fluid passageway in a valve body.

BACKGROUND AND SUMMARY OF THE INVENTION

When a valve seat member is pressed into a bore in a fluid passageway of a valve body, it is a typical practice to provide the valve seat member with a lead-in that serves to align the valve seat member with the bore for a proper press fit. The lead-in is required to have a certain chamfer angle so that metal is properly displaced during the press-fitting operation.

The constraints imposed on certain valves may be such that a valve seat member can be pressed into a valve body bore from only one direction, and there may be impediments to obtaining a proper press-fit. One such impediment may involve the nature of the bore itself. The bore may have a counterbore through which the valve seat member must pass before it reaches the press-fit diameter portion of the bore. This provides a potential for a greater degree of misalignment between the seat member and the press-fit diameter portion of the bore during the process of inserting the seat member into the bore. Certain constraints are also imposed on the lead-in, especially as it merges into the press-fit diameter portion of the seat member. Typically, the chamfer angle of the lead-in must be rather shallow as it merges into the press-fit diameter portion of the valve seat member, fifteen degrees for example. Also, the fifteen degree chamfer must have an axial dimension that will assure a proper radial distance of its beginning relative to the press-fit diameter portion of the seat member. When a seat member is pressed into a valve body bore by automated assembly equipment, some degree of alignment must be inherent in the equipment; yet, this may not always be sufficient for certain valve designs. A more precise alignment may be helpful, but it may be rather expensive and it may not always provide a desired degree of improvement.

Given constraints and considerations such as those just discussed, it may happen in the automated assembly of valve seats into valve body bores that an occasional misaligned valve seat member nicks a shoulder of a counterbore as it is being inserted into the bore, shaving a sliver of metal in the process. This could affect the press fit, or even separate.

The present invention is directed to a novel construction for a lead-in that results in improved press-fitting of a valve seat member to a bore of a valve body. While some degree of improvement in accuracy of assembly equipment may be helpful, it is believed that the present invention provides sufficient improvement in its own right that it may be a more efficient way to improve the press-fitting process so that there is a significantly reduced, if not entirely eliminated, potential for nicking of a counterbore with potentially attendant silver generation.

The present invention contemplates the provision of a lead-in that has two distinctive regions: one, an initial chamfer portion that is has angle and size which assure that at maximum misalignment and all lesser degrees of misalignment, it will engage the counterbore shoulder without shaving material from the bore at the junction of the shoulder and the press-fit diameter portion of the bore; and two, a transition chamfer portion that provides a transition between the initial chamfer portion and the press-fit diameter portion of the valve seat member. The transition chamfer portion has a chamfer angle less than the chamfer angle of the initial chamfer portion that assures that the transition chamfer portion also will not shave material from said bore at the junction of the shoulder and the press-fit diameter portion of the bore.

In the disclosed embodiment, the angle of the initial chamfer portion is substantially 30 degrees and that of the transition chamfer portion is substantially 15 degrees. The initial chamfer portion and the transition chamfer portion meet at a radial distance from the press-fit diameter portion of the valve seat member that is 0.050 mm.

The foregoing, as well as further features, advantages, and benefits of the invention will be seen in the ensuring description and claims which are accompanied by drawings. The drawings disclose a presently preferred embodiment of the invention according to the best mode contemplated at this time for carrying out the invention.

DESCRIPTION OF THE PREFERRED EMBODIMENT

Figure 1:
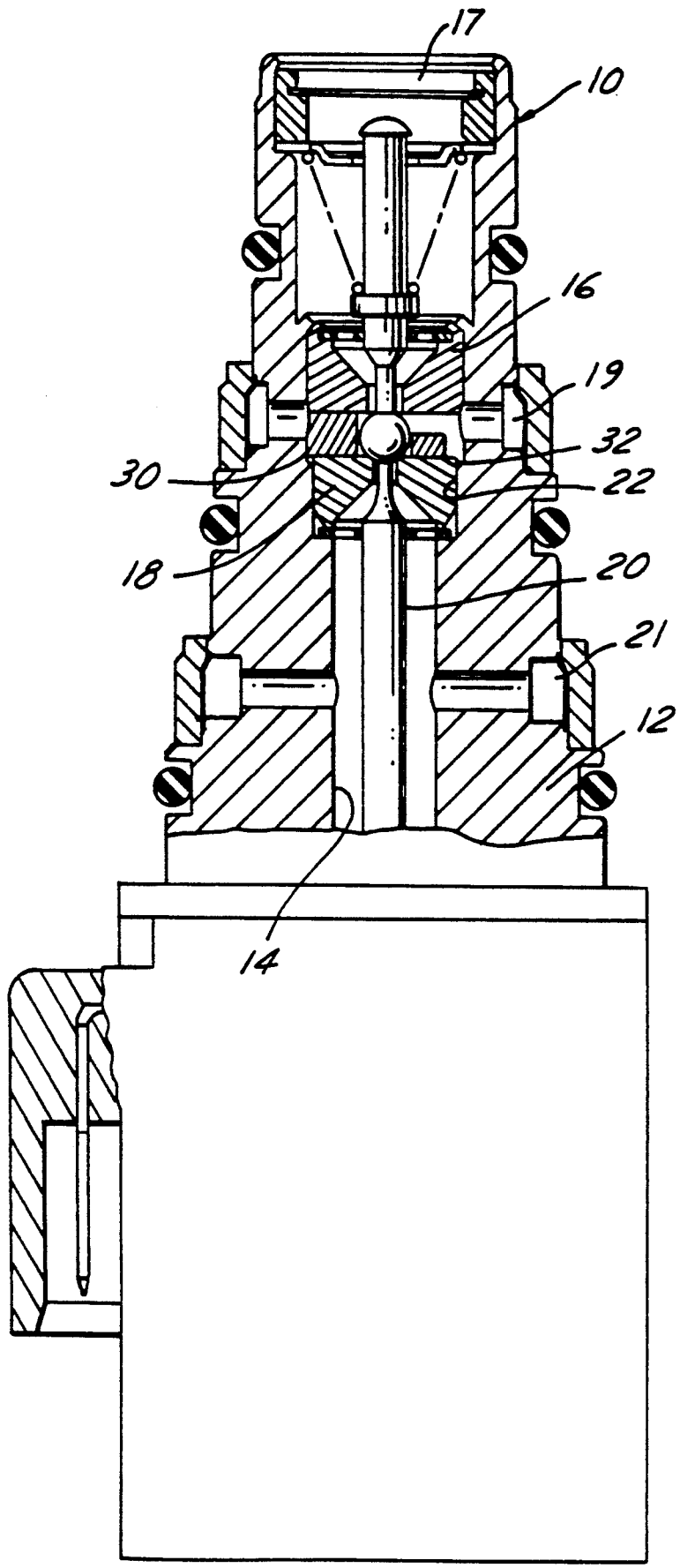
FIG. 1 is a longitudinal view of a representative valve assembly, partly in cross section.

FIG. 1 shows a valve assembly 10 comprising a valve body 12 having a central throughbore 14. Two valve seat members 16, 18 are disposed in throughbore 14 and a solenoid operated valve mechanism 20 is associated with members 16 and 18. Body 12 has three ports 17, 19, 21, one of which is a pressure port, another of which is a drain port, and the third of which is a control port. Valve assembly 10 operates by pulse width modulation of its solenoid to control flows through the valve seats such that the fluid pressures at the pressure and dump ports are modulated to the control port.

Valve seat member 18 is press-fit in a press-fit diameter portion 22 of throughbore 14, and as can be appreciated from FIG. 1, it is only possible to insert seat member 18 into the throughbore via the larger diameter upper end.

Figure 2:
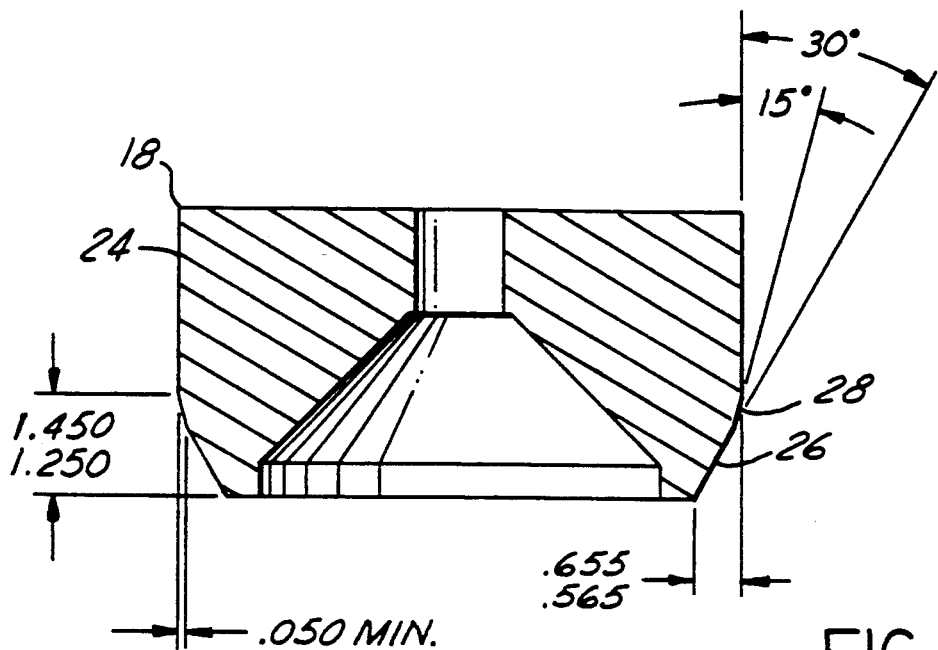
FIG. 2 is an enlarged diametrical cross-section through a valve seat member of the valve assembly of FIG. 1.

As shown by FIG. 2, valve seat member 18 comprises a press-fit diameter portion 24. It also has a lead-in consisting of an initial chamfer portion 26 and a transition chamfer portion 28 that is between portions 24 and 26. The chamfer angle of portion 26 is thirty degrees, and that of portion 28 is fifteen degrees.

The junction of portions 26 and 28 is located so as to be at least 0.050 mm. radially inwardly of portion 24, and in this embodiment substantially 0.050 mm. radially inwardly of portion 24. This particular dimension takes into account the manufacturing tolerances of the respective parts to assure that there will be a proper press-fit. In other embodiments, a dimension different from the 0.050 mm. one may be used.

Throughbore 14 has a counterbore which comprises a clearance diameter portion 30 that joins with portion 22 by a shoulder 32. Since valve seat member 18 must pass through the counterbore as part of the press-fit process, it must pass across shoulder 32.

Figure 3:
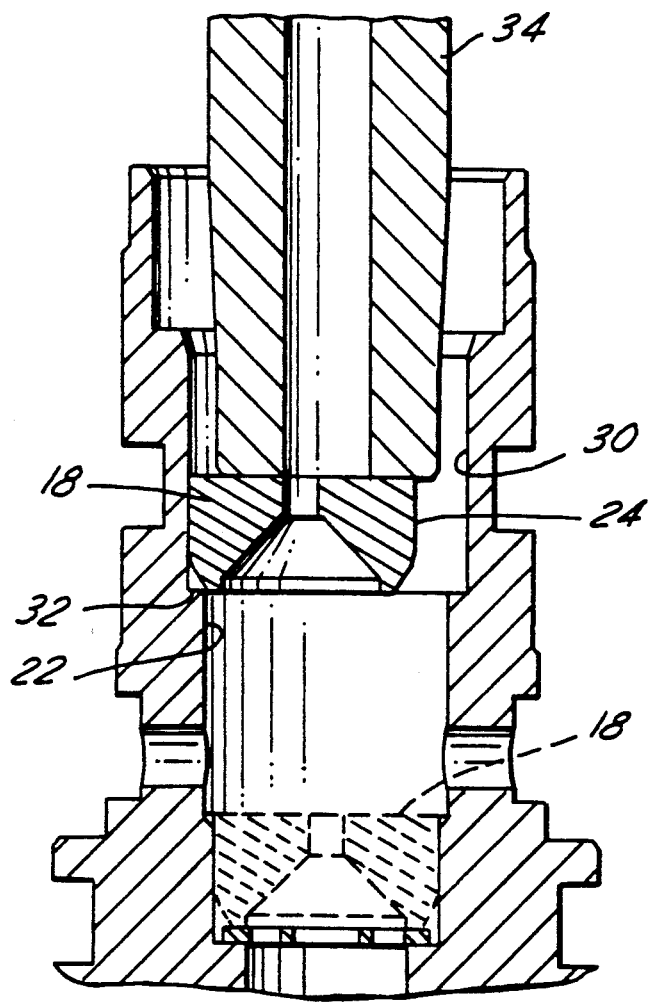
FIG. 3 is a cross-sectional view showing a maximum misalignment condition during the process of pressing the valve seat member into the body of the valve assembly and also showing the final press-fitted position of the valve seat member in the valve body.

FIG. 3 shows the pressing operation wherein a press tool 34 is pushing the valve seat member into the counterbore. This Figure also shows a condition of maximum misalignment between the press-fit diameter portions 22 and 24. Even with this maximum misalignment, the invention assures that it is initial chamfer portion 26 that will contact the corner edge of the shoulder at its junction with portion 22. The chamfer of portion 28 is a proper angle to avoid shaving of material due to the contact, as the lead-in passes across this corner edge. Yet when the seat member has been moved further, the centering action will cause the final aligning to be performed by portion 28 which has a shallower angle so that proper press-fitting will be assured, also without any shaving of material between portion 28 and the corner edge across which it passes. If shoulder 32 had a smaller radial dimension, the initial chamfer portion 26 could have a smaller angle. This Figure also shows the final press-fit position of the valve seat member in broken lines.

While a presently preferred embodiment of the invention has been illustrated and described, it should be appreciated that principles are applicable to other embodiments.

What is claimed is:

1. A valve assembly which comprises a valve body having a fluid flow path extending between ports, said flow path comprising a bore in said body into a press-fit diameter portion of which a valve seat member is pressed, said valve assembly comprising a valve member that cooperates with said seat member to control flow through said flow path, said bore comprising a clearance diameter portion that is spaced axial of said press-fit diameter portion and separated therefrom by a shoulder, said valve seat member being assembled to said valve body by passing said valve seat member through said clearance diameter portion and then pressing said valve seat member into said press-fit diameter portion, said valve seat member comprising a press-fit diameter portion that is press-fit to said press-fit diameter portion of said bore and a lead-in chamfer that serves to engage said shoulder and align said press-fit diameter portion of said valve seat member with said press-fit diameter portion of said bore during assembly of said valve seat member to said valve body if said press-fit diameter portion of said valve seat member is misaligned with said press-fit diameter portion of said bore as said valve seat member begins to enter said press-fit diameter portion of said bore, characterized in that said lead-in chamfer comprises an initial chamfer portion having a particular chamfer angle and size which assure that at maximum misalignment and all lesser degrees of misalignment, said initial chamfer portion will engage said shoulder without shaving material from said bore at the junction of said shoulder and said press-fit diameter portion of said bore, and in that said lead-in chamfer further comprises a transition chamfer portion that provides a transition between said initial chamfer portion and said press-fit diameter portion of said valve seat member, said transition chamfer portion having a chamfer angle less than the particular chamfer angle of said initial chamfer portion that assures that said transition chamfer portion also will not shave material from said bore at the junction of said shoulder and said press-fit diameter portion of said bore.

2. A valve assembly as set forth in claim 1 wherein said particular angle of said initial chamfer portion is substantially 30 degrees and said chamfer angle of said transition chamfer portion is substantially 15 degrees.

3. A valve assembly a set forth in claim 2 wherein said initial chamfer portion and said transition chamfer portion meets at a radial distance from said press-fit diameter portion of said valve seat member that is at least 0.050 mm.

4. A valve assembly a set forth in claim 3 wherein said initial chamfer portion and said transition chamfer portion meets at a radial distance from said press-fit diameter portion of said valve seat member that is substantially 0.050 mm.

* * * * *